United States Patent
Gross et al.

[11] Patent Number: 5,968,170
[45] Date of Patent: Oct. 19, 1999

[54] PRIMARY SWAP SIZE INCREASE ON A UNIX BASED COMPUTER SYSTEM

[75] Inventors: Danny Brice Gross, Bastrop; Michael Douglas O'Donnell, Austin; Gene Regis Toomey, Kyle, all of Tex.

[73] Assignee: Advanced Micro Devices, Inc., Sunnyvale, Calif.

[21] Appl. No.: 08/841,512

[22] Filed: Apr. 23, 1997

[51] Int. Cl.⁶ .................................................. G06F 9/445
[52] U.S. Cl. .............................................. 713/1; 713/100
[58] Field of Search ...................... 395/652, 427, 395/497.02, 182.13, 600, 182.05; 711/114, 208, 173, 171; 713/1, 100, 2; 709/223

[56] References Cited

U.S. PATENT DOCUMENTS

| | | | |
|---|---|---|---|
| 4,855,903 | 8/1989 | Carleton et al. | 364/200 |
| 4,918,653 | 4/1990 | Johri et al. | 364/900 |
| 4,958,273 | 9/1990 | Anderson et al. | 364/200 |
| 5,155,837 | 10/1992 | Liu et al. | 395/500 |
| 5,155,847 | 10/1992 | Kirouac et al. | 395/600 |
| 5,201,050 | 4/1993 | McKeeman et al. | 395/707 |
| 5,237,460 | 8/1993 | Miller et al. | 360/8 |
| 5,276,867 | 1/1994 | Kenley et al. | 395/600 |
| 5,341,494 | 8/1994 | Thayer et al. | 395/425 |
| 5,454,103 | 9/1995 | Coverston et al. | 395/600 |
| 5,490,260 | 2/1996 | Miller et al. | 395/427 |
| 5,539,899 | 7/1996 | Huynh et al. | 395/497.02 |
| 5,574,851 | 11/1996 | Rathunde | 395/182.05 |
| 5,577,233 | 11/1996 | Goettelmann et al. | 395/500 |
| 5,627,995 | 5/1997 | Miller et al. | 711/171 |
| 5,675,795 | 10/1997 | Rawson, III et al. | 395/652 |
| 5,678,042 | 10/1997 | Pisello et al. | 395/610 |
| 5,696,897 | 12/1997 | Dong | 395/182.13 |
| 5,696,968 | 12/1997 | Merkin | 395/652 |
| 5,701,516 | 12/1997 | Cheng et al. | 395/842 |
| 5,715,464 | 2/1998 | Crump et al. | 395/750 |
| 5,737,745 | 4/1998 | Matsumoto et al. | 711/114 |
| 5,771,354 | 6/1998 | Crawford | 395/200.59 |
| 5,778,395 | 7/1998 | Whiting et al. | 707/204 |
| 5,784,702 | 7/1998 | Greenstein et al. | 711/173 |
| 5,790,849 | 8/1998 | Crocker et al. | 395/652 |
| 5,802,297 | 9/1998 | Engquist | 395/200.42 |
| 5,805,903 | 9/1998 | Elkhoury | 395/750.01 |
| 5,809,564 | 9/1998 | Craze et al. | 711/208 |
| 5,819,061 | 10/1998 | Glassen et al. | 395/406 |
| 5,862,333 | 1/1999 | Graf | 709/223 |

*Primary Examiner*—Joseph E. Palys
*Assistant Examiner*—Rijue Mai
*Attorney, Agent, or Firm*—Skjerven, Morrill, MacPherson, Franklin & Friel LLP

[57] ABSTRACT

A method for increasing the size of a primary swap partition on a computer system operating under control of a UNIX type operating system. The computer system includes a first storage device. The first storage device includes a primary swap partition. The method includes identifying whether a valid storage areas exists at a location on the first storage device such that the contiguous expansion of the primary swap partition is impeded and preparing the valid storage area, if the valid storage area exists, for allocation as an available storage area to allow contiguous expansion of the primary swap space. The method further includes booting the computer system to a single user mode, increasing the size of the primary swap partition without reinstalling the UNIX type operating system, and rebooting the computer system.

23 Claims, 3 Drawing Sheets

PRIMARY SWAP SIZE INCREASE ON A UNIX BASED COMPUTER SYSTEM

CROSS-REFERENCE TO RELATED APPLICATIONS

This application relates to co-pending U.S. application Ser. No. 08/841,539, filed on the same day as the present application and, entitled "Root File System Size Increase on a UNIX Based Computer System", by Danny B. Gross, Michael D. O'Donnell and Gene R. Toomey, and which is incorporated herein by reference.

This application relates to co-pending application, Ser. No. 08/841,513, filed on the same day as the present application and, entitled "Swap Size Decrease on a UNIX Based Computer System", by Danny B. Gross, Michael D. O'Donnell and Gene R. Toomey, and which is incorporated herein by reference.

This application relates to co-pending application, Ser. No. 08/841,540, filed on the same day as the present application and, entitled "Root Size Decrease on a UNIX Based Computer System", by Danny B. Gross, Michael D. O'Donnell and Gene R. Toomey, and which is incorporated herein by reference.

BACKGROUND

1. Field of the Invention

This invention relates to computer systems and, more particularly, to methods of increasing the size of primary swap spaces on UNIX type operating system based computer systems.

2. Description of the Related Art

Computer systems are information handling systems which can be designed to give independent computing power to one user or a plurality of users. Computer systems have attained widespread use in providing computer power to many businesses and institutions. Some important applications in which computer systems have become common include manufacturing monitoring and control; electrical, mechanical, and chemical system design and simulation; and network management and service. Productive processing time is of great importance to the users of these computer applications because system down time can result in significant costs.

Computer systems are designed to provide a degree of system availability that is necessitated by the applications for which the computer system is intended. System availability ranges from the ability of a system to remain functional in spite of failures in a portion thereof, to the minimization of a system's down-time in the event of a failure or necessary upgrade. High availability (HA) computer systems, as their name implies, are required to be available, or "on," virtually all of the time. For example, because many computer applications involve the use of network servers to provide processing power to multiple users, it is important that the network server be available as much as possible. Such computer systems (or networks of such computer systems) should be capable of being upgraded with minimal system down time.

High availability computer systems must be able to restart as soon as possible after a system upgrade. System upgrades or patches are often necessitated by the establishment of new system requirements. Unfortunately, performing a system upgrade such as resizing the primary swap space on a UNIX based computer system requires that the computer system be powered down or turned off, and that the operating system be reinstalled with the required changes.

Commonly, when a computer system requires an upgrade, patches are made to the operating system of the computer system. Often, new patches are added to the patches from a previous system upgrade resulting in a large number of patches for each successive upgrade. The successful patches are then updated to other computer systems by replacing the present operating system of those computer systems with the new operating system including the successful patches. The new operating system is often installed from a storage device such as a tape drive to directly replace the present operating system needing the upgrade. Alternatively, the new operating system can be downloaded over a network.

Use of the method set forth above has certain consequences. Notably, using this method usually requires that the computer system be shut down. A backup of the present operating system usually must be made, and the upgrades or patches must be loaded while the computer system is down. Additionally, upgrades must often be made for multiple computer systems, causing down-time for all the systems involved. For example, in a network of servers, each server must be upgraded individually. That is, the system manager must power down a server, thereby limiting server availability by preventing user access, make a backup of the present operating system, load the new operating system, and test the new operating system. The system manager then repeats these actions for each of the other servers. The computer system being upgraded is usually down throughout the procedure, possibly for a period of hours. The cost for system downtime during these upgrades can be significant. Also, the chances for error or failure can be significant with this practice.

An alternative method allows upgrading a computer system while the computer system is operating. An operating system may be upgraded by selecting and preparing a new boot device while the computer system is functioning, loading the new operating system onto the new boot device while the computer system is functioning, and rebooting the computer system using the new boot device. Such a method of upgrading computer systems is disclosed in U.S. patent application Ser. No. 08/785,491, attorney docket No. M-4525 US, filed on Jan. 17, 1997, entitled "Installing Operating Systems Changes on a Computer System," naming Danny B. Gross, Michael D. O'Donnell and Gene R. Toomey as inventors.

SUMMARY

It has been discovered that a computer system may be upgraded by increasing the size of the primary swap space on the computer system without having to reinstall the operating system on the computer system or preparing an alternate boot device. Such a procedure advantageously allows the computer system to be upgraded while minimizing the system's resulting down time, the potential errors during operating system reinstallation, and the resources required for a system upgrade. Thus, the reliability and efficiency of making upgrades is improved with a simplified upgrade procedure that also reduces costs resulting from computer system upgrades requiring primary swap space increases.

In one embodiment of the invention, a method for increasing the size of a primary swap partition on a computer system operating under control of a UNIX type operating system is provided. The computer system includes a first storage device. The first storage device includes a primary swap partition. The method includes identifying whether a valid storage areas exists at a location on the first storage device such that the contiguous expansion of the primary swap partition is impeded and preparing the valid storage area, if the valid storage area exists, for allocation as an available storage area to allow contiguous expansion of the primary swap space. The method further includes booting the computer system to a single user mode, increasing the size of the primary swap partition without reinstalling the UNIX type operating system, and rebooting the computer system.

In another embodiment, a method for increasing the size of the primary swap logical volume is provided. A computer system operates under control of a UNIX type operating system and an LVM subsystem. The computer system includes a root volume group. The root volume group includes a primary swap logical volume. The method includes booting the computer system to single user mode, activating the root volume group, and increasing the size of the primary swap logical volume without reinstalling the UNIX type operating system.

In another embodiment, an apparatus includes a computer-readable storage medium and an upgrade module. The upgrade module is stored on the computer-readable storage medium. The upgrade module is for upgrading a first computer system responsive to being accessed by a second computer system. The second computer system operates under control of a UNIX type operating system. The second computer system includes a primary swap partition.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the preferred embodiments. The description is intended to be illustrative of the invention and should not be taken to be limiting. Many variations, modifications, additions, and improvements may fall within the scope of the invention as defined in the claims which follow.

In one embodiment, a computer system is upgraded to increase the size of the primary swap space. A storage device is added to the root volume group to store any identified logical volumes that prevent the primary swap space from being expanded contiguously. The identified logical volumes are moved to the added storage device. The computer system is rebooted into single user mode, and the logical volume corresponding to the primary swap space is extended. When the computer system is brought back on line, the moved logical volumes are restored to the original storage device.

Figure 1:
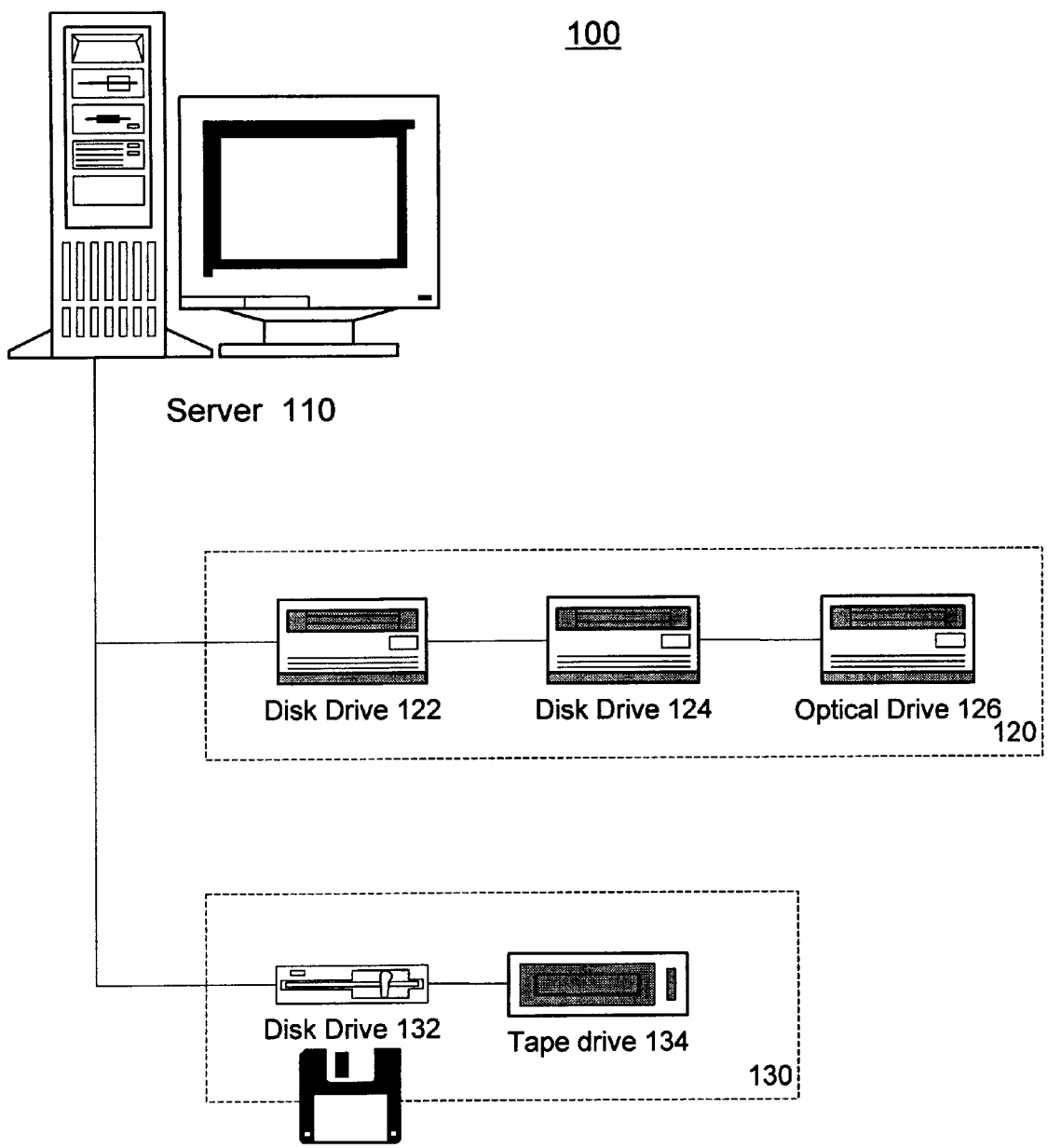
FIG. 1 shows an exemplary computer system according to an embodiment of the invention.

Referring to FIG. 1, exemplary computer system 100 includes server 110 which is coupled to various memory storage devices. The memory storage devices are coupled to server 110 by Small Computer System Interface (SCSI) chains 120 and 130. The memory storage devices include disk drives 122 and 124 and optical disk 126 in SCSI chain 120, and disk drive 132 and tape drive 134 in SCSI chain 130.

In one embodiment, computer system 100 is, for example, a Hewlett Packard Series 800 computer system running the HP-UX 9.04 type UNIX operating system. Such a computer system may function as a server for other computer systems. It is understood that other computer systems and other UNIX operating systems (e.g., the International Business Machines AIX operating system) may be used in accordance with the invention. Additionally, although the disk drives are connected to their respective computer systems in SCSI chains in the preferred embodiment, any appropriate connection means may be used in accordance with the invention. Further although computer system 100 includes server 110, computer system 100 may include any type of computer system, including, for example, mainframes, minicomputers, workstations and personal computer systems.

Exemplary computer system 100 operates under control of the optional Logical Volume Manager (LVM) subsystem of the HP-UX operating system. The LVM system enables system administrators to manage disk space in terms of volume groups and logical volumes rather than, or in addition to, fixed-sized disk sections. A volume group can include, for example, multiple physical volumes (physical disks) and/or multiple logical volumes (logical disks).

Specifically, the storage of a computer system configured according to the LVM system consists of groupings of disks initialized for LVM and organized into volume groups. A volume group might include one or many LVM disks, and an entire system may include one or several volume groups. Just as volume groups are groupings of one or more physical LVM disks, also called physical volumes, volume groups are also subdivided into virtual disks, called logical volumes.

A logical volume is a partition. As such, a logical volume is a distinct portion of a storage device that functions as though it were a physically separate unit. Logical volumes can encompass space on one or more physical volumes, span physical volumes, and/or represent only a portion of a physical volume. Like disk sections, logical volumes can hold file systems, swap areas, and raw data. Disk space in a volume group is apportioned by creating logical volumes. The size of a logical volume is determined by its number of extents, each being four megabytes by default, and is configurable. File systems and swap space are then assigned to the logical volumes within the volume group.

Typically, using basic UNIX commands, a logical volume can be created and extended to allocate sufficient space for a file system, user application, or raw data. New file systems may be mounted or applications installed on the logical volume. The same approach may be used when increasing the capacity of a file system created on a logical volume.

The root volume group is a special volume group that includes the system boot disks, storage areas designated for containing specific data such as the root file system (/) logical volume and the file system containing /usr, storage areas with designated space for storing temporary data such as the primary swap logical volume and the file system containing /tmp. The root, primary swap and usr logical extents may be mapped to physical extents on the same physical disk or on different physical disks within the root volume group. Typically, the root, primary swap, /usr and /temp logical volumes are created contiguous with each other within the root volume group. Other embodiments may include other logical volumes and file systems.

The primary swap space is typically a space on a secondary storage device (such as a disk) that is allocated for memory swapping. For example, in a client/server environment, the server may store some client processes in the swap space while other client processes are being serviced. As such, the swap space has no intrinsic data. There is no file system corresponding to the primary swap logical volume as there is a /usr file system to correspond to the /usr logical volume.

The logical volume corresponding to the primary swap space can be located on any disk in the root volume group. The primary swap logical volume should be created with contiguous allocation of physical extents. Also, the size of the root logical volume is typically predetermined.

Figure 2:
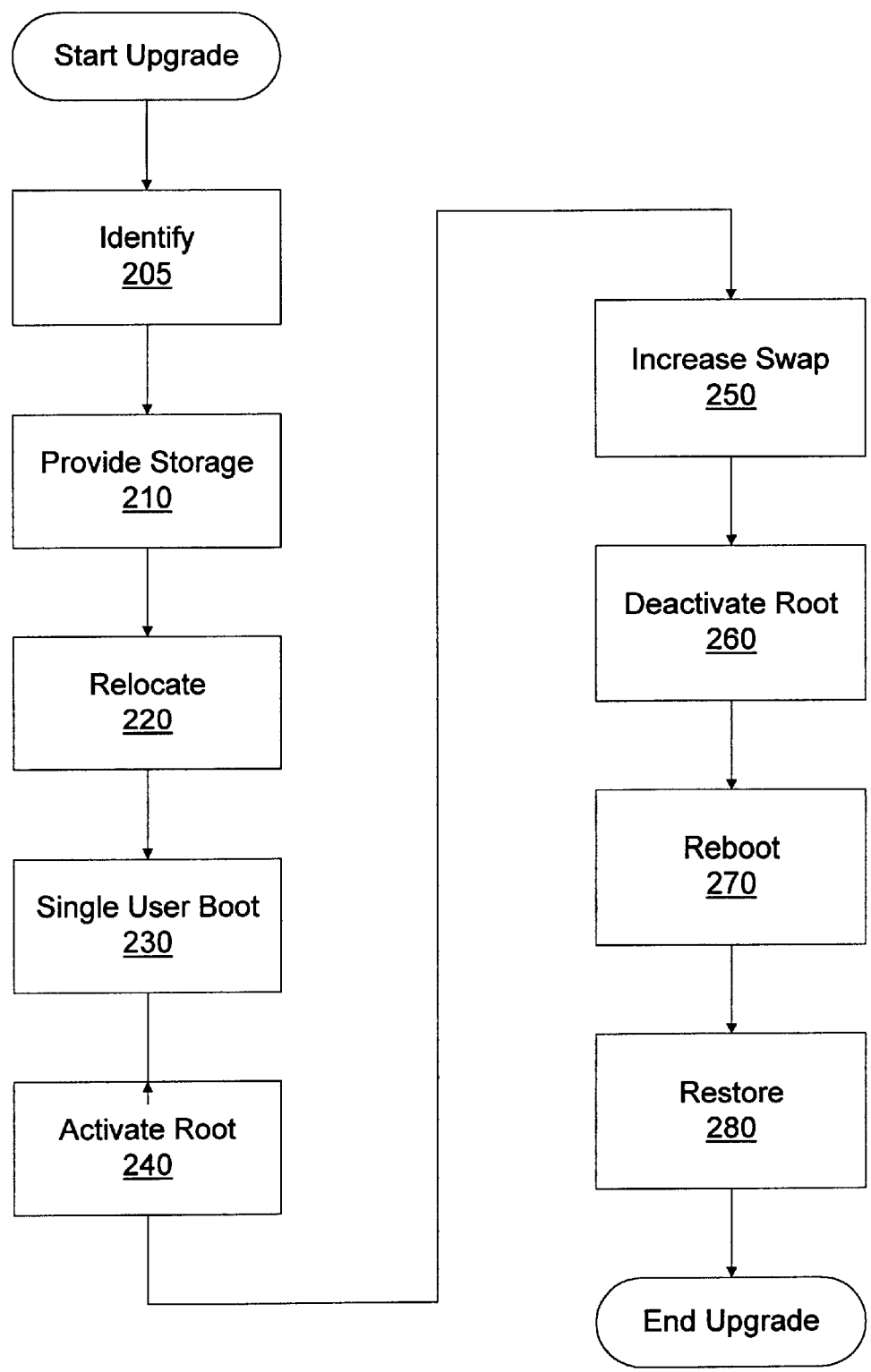
FIG. 2 shows a flow chart for increasing the size of the primary swap space according to an embodiment of the invention.

FIG. 2 shows a flow chart of the operation of an upgrade module for upgrading computer system 100 by increasing the size of the primary swap without reinstalling the operating system of computer system 100. At identify step 205, information that is stored at a location which impedes the contiguous expansion of the primary swap space of computer system 100 is identified. For example, the pvdisplay command displays information about physical volumes within a specified volume group. If the -v (verbose) option is specified, pvdisplay displays a map of the logical extents that correspond to the physical extents of each physical volume. The verbose option lists additional information for each logical volume and for each physical extent on a physical volume. Thus, it is determined whether there is information stored near the primary swap space of computer system 100.

Control then transitions to provide storage step 210. During provide storage step 210, storage is added for temporarily storing the information identified in identify step 205. During provide storage step 210, a storage device is added to the root volume group to store any identified logical volumes that prevent the primary swap space from being expanded contiguously. In one embodiment, a physical storage device is added to the root volume group. In other embodiments, other types of storage may be provided. For example, a logical device within the root volume group or another volume group may be provided as storage. The storage may be provided on a physical storage device the same as or different from the physical storage device of the root volume group, or on a logical storage device the same as or different from the logical storage device already storing the information.

The storage space that is allocated to store the identified logical volumes must be large enough to store the identified logical volumes. For example, if the /usr logical volume (/dev/vg00/lvol3) and the /tmp logical volume (/dev/vg00/lvol14) are identified as being located such that the contiguous expansion of the primary swap logical volume is prevented, the /usr and /tmp logical volumes must be relocated. Therefore, the allocated storage space must be large enough to accommodate both logical volumes. Other embodiments of computer system 100 may include other logical volumes and file systems which must be relocated, thus altering the amount of provided storage required.

Control then transitions to relocate step 220. During relocate step 220, the information identified in identify step 205 is relocated to the storage provided in provide storage step 210. The information may be loaded to the provided storage by either copying or moving the /usr file system. For example, the pvmove command is used to relocate the /usr logical volume:

pvmove -n/dev/vg00/lvol3 <SOURCE_DISK>
/dev/dsk/ <STORAGE>

The pvmove command moves allocated physical extents and the data they contain from one physical volume to one or more other physical volumes. All destination physical volumes must be within the same volume group. The option -n moves only the physical extents allocated to the logical volume specified (/dev/vg00/lvol3) that are located on the source physical volume (<SOURCE_DISK>). The <SOURCE_DISK> is the device file corresponding to the disk on which lvol3 resides. The argument /dev/dsk/ <STORAGE> specifies the destination physical volume. This command may be executed with minimal overhead while computer system 100 is operational.

Other UNIX commands and combinations of commands may be used to relocate the identified information in accordance with relocate step 220. For example, a temporary backup file system could be created using combinations of the well known commands lvcreate, newfs, mount and dump.

Figure 3:
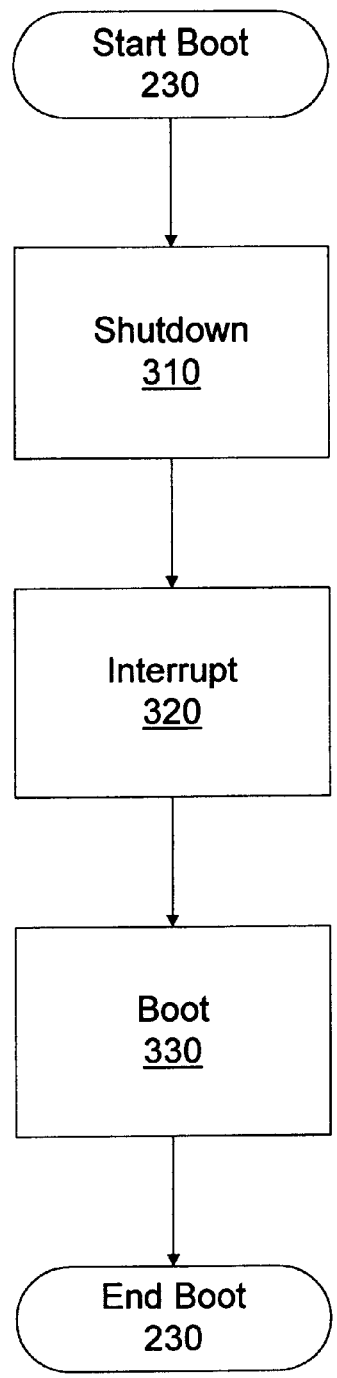
FIG. 3 shows a flow chart for booting the exemplary computer system of FIG. 1 according to an embodiment of the invention.

After the information that is adjacent to the primary swap space is moved to make room for the larger primary swap space during relocate step 220, control transitions to boot step 230. FIG. 3 shows a flow chart of the operation of a boot module for booting computer system 100 to single user mode. It is appreciated that the boot module and other modules discussed herein may consist of directly entered commands, or steps executed by a software module or a hardware module either directly on computer system 100 or remotely on computer system 100 from another computer system.

At shutdown step 310, computer system 100 is shutdown using the following command: /etc/shutdown -r.

Control then transitions to interrupt step 320. During interrupt step 320, the reboot of computer system 100 is interrupted. After computer system 100 performs its memory checks, computer system 100 provides an opportunity to interrupt the boot cycle. For example, computer system 100 prompts the user to "press any key to interrupt." Responsive to a boot process interrupt, computer system 100 displays a boot drive selection prompt such as "Boot from primary path?" prompt, to which the user responds "y". Computer system 100 next displays an "Interact with IPL?" prompt to which the user also responds "y".

Control then transitions to reboot step 330. During reboot step 330, computer system 100 is booted to single user mode. For example, the command hpux is a specific secondary system loader (SSL) utility for loading the operating system kernel. The exemplary boot command hpux -lm (;0) /hp-ux boots computer system 100. The -lm option indicates that computer system 100 is to be booted to LVM maintenance mode (i.e., brought to single user mode without activating any volume groups). The -lm option configures only the root volume group before initiating single user mode. The command line argument (;0) designates the default boot disk. The /hp-ux argument is the actual kernel file that computer system 100 loads into memory. When computer system 100 is booted, the UNIX operating system has been installed into the memory of computer system 100. Computer system 100 is in single user mode and all volume groups are deactivated including the root volume group (which contains the primary swap space).

Control then transitions to activate root step 240. During activate root step 240, the root volume group is activated, thereby making the root volume group available for manipulation. The command

```
vgchange -a y /dev/vg00
``` activates the root volume group (vg00). The -a y option activates the particular volume group named by the immediately following argument (/dev/vg00), and activates all associated physical volumes (e.g., disk drives) and logical volumes.

Control then transitions to increase swap step 250. During increase swap step 250, the lvextend command is used to increase the size (the number of physical extents) allocated to the primary swap logical volume:

```
lvextend -l <SIZE> /dev/vg00/lvol2.
```

The -l option instructs the system to increase the amount of space allocated to the primary swap logical volume (/dev/vg00/lvol2) to the number of logical extents indicated by <SIZE>.

Control then transitions to deactivate root step 260. During deactivate root step 260, the root volume group is deactivated by using the following command:

```
vgchange -a n /dev/vg00
```

The availability option -a n makes the root volume group vg00 temporarily unavailable. The root volume group is deactivated prior to reboot for administrative consistency reasons. Deactivate root step 260 is optional.

Control then transitions to reboot step 270. During reboot step 270, computer system 100 is rebooted to make the changes take effect. The /etc/reboot command reboots computer system 100.

Control then transitions to restore step 270. During restore step 270, the previously relocated logical volume or volumes may be moved back to the original disk in a manner similar to the manners disclosed above at relocate step 220. Restore step 270 may occur prior to reboot step 260, but executing restore step 270 after reboot step 260 allows computer system 100 to be operational sooner.

While the invention has been described with reference to various embodiments, it will be understood that these embodiments are illustrative and that the scope of the invention is not limited to them. Many variations, modifications, additions, and improvements of the embodiments described are possible.

For example, although the above commands may be entered into a computer system by a computer system user, the above commands may be included in a script, batch or executable file which can be stored on a machine-readable or computer-readable storage medium such as disk drive 132 or a CD-ROM. Furthermore, a computer system may be configured to execute the above commands on another computer system, thereby performing the upgrade without reinstalling the operating system on the other computer system. This embodiment is useful in a distributed computing environment.

Also, those skilled in the art will recognize that the UNIX commands and options of the preferred embodiment are exemplary and that other commands and options of the UNIX operating system or similar operating systems (such as the IBM AIX operating system) may be used in accordance with the invention. Modifications to the above series of commands will be apparent to those skilled in the art.

Additionally, those skilled in the art will recognize that although the functions of the above referenced modules are performed by user inputs or software modules in the present embodiment, other types of modules may be used such as application specific hardware modules and configured hardware modules. Also, the boundaries between modules are merely illustrative and alternative embodiments may merge modules or impose an alternate decomposition of functionality of modules. For example, a software module for booting the computer system to single user mode and a software module for rebooting the computer system after the primary swap size is increased may be merged into a single boot module. The merged boot module could be initiated with different parameters to boot to different modes. Alternatively, a reboot module for rebooting a computer system may be decomposed into modules to perform the separate steps of the original reboot module. For example, the reboot module could be decomposed into a shutdown module, an interrupt module and a single user boot module. Moreover, alternative embodiments may combine multiple instances of a particular component.

These and other variations, modifications, additions, and improvements may fall within the scope of the invention as defined in the claims which follow.

What is claimed is:

1. In a computer system operating under control of a UNIX type operating system, the computer system including a first storage device, the first storage device including a primary swap partition, the primary swap partition having a size, a method for increasing the size of the primary swap partition, the method comprising:

determining whether a valid storage areas exists at a location on the first storage device such that contiguous expansion of the primary swap partition is impeded;

preparing the valid storage area, if the valid storage area exists, for allocation as an available storage area to allow contiguous expansion of the primary swap space;

booting the computer system to a single user mode;

increasing the size of the primary swap partition without reinstalling the UNIX type operating system; and rebooting the computer system.

2. The method of claim 1 wherein the determining includes determining whether first information is stored in the valid storage area, the first information requiring relocation from the valid storage area to create storage space for the primary swap partition to be increased in size; and the preparing includes loading the first information to a backup storage area, if the first information is determined, so that the valid storage area is available for allocation to at least a portion of the primary swap partition when the primary swap partition is increased in size.

3. The method of claim 2 wherein the method further comprises:

restoring the first information from the backup storage area to a storage area on the first storage device substantially contiguous with the primary swap partition after increasing the size of the primary swap partition.

4. The method of claim 1 wherein the determining includes determining whether at least a portion of the valid storage area is designated for storing second information; and the preparing includes undesignating the at least a portion of the valid storage area for storing the second information so the at least a portion of the valid storage area is available for allocation to at least a portion of the primary swap partition when the primary swap partition is increased in size.

5. The method of claim 4 further comprising:

designating a storage area for storing the second information, the storage area being located on the first storage device substantially contiguous with the primary swap partition after increasing the size of the primary swap partition.

6. The method of claim 1 wherein the computer system further operates under control of a logical volume manager operating subsystem;

the first storage device is a volume group; and the primary swap partition is a logical volume.

7. A computer system operating under control of a UNIX type operating system and a logical volume manager subsystem, the computer system including a root volume group, the root volume group including a primary swap logical volume, the primary swap logical volume having a size, a method for increasing the size of the primary swap logical volume, the method comprising:

booting the computer system to single user mode;

activating the root volume group; and increasing the size of the primary swap logical volume without reinstalling the UNIX type operating system.

8. The method of claim 7 wherein the method further comprises:

deactivating the root volume group after increasing the size of the primary swap logical volume.

9. The method of claim 8 wherein the method further comprises:

rebooting the computer system after deactivating the root volume group.

10. The method of claim 7 wherein the method further comprises:

rebooting the computer system after increasing the size of the primary swap logical volume.

11. The method of claim 7 wherein the method further comprises:

preparing a first storage area so that the first storage area is available for designation as primary swap space, the first storage area being adjacent to a second storage area containing the swap logical volume, the first storage area being prepared before booting the computer system to single user mode.

12. The method of claim 11 wherein the preparing the first storage area comprises:

relocating data stored in the first storage area if data is stored in the first storage area; and redesignating portions of the first storage area as available storage space if portions of the first storage area are designated to store temporary information.

13. The method of claim 12 further comprising:

restoring the relocated data to a storage area on the root volume group after increasing the size of the primary swap logical volume.

14. The method of claim 7 wherein a first computer system is configured to upgrade a second computer system, the second computer system operating under control of a UNIX type operating system, the second computer system including the primary swap logical volume, the first computer system comprising:

a boot module, the boot module booting the computer system to single user mode;

an activation module, the activation module activating the root volume group responsive to the boot module booting the computer system to single user mode; and a resize module, the resize module increasing the size of the primary swap logical volume responsive to the activation module activating the root volume group.

15. The method of claim 14 wherein the first computer system and the second computer system are the same computer system.

16. An apparatus for increasing the size of a primary swap space on a first computer system operating under control of a UNIX type operating system, the apparatus comprising:

a computer-readable storage medium; and an upgrade module stored on the computer-readable storage medium, the upgrade module for upgrading the first computer system by increasing the size of the primary swap space on the first computer system without reinstalling the operating system, the upgrade module upgrading the first computer system responsive to being accessed by a second computer system.

17. The apparatus of claim 16 wherein the upgrade module comprises:

a first boot portion for booting the computer system to a single user mode;

an activation portion for activating the root volume group after the second computer system is booted to single user mode by the first boot module; and a resize portion for increasing the size of the primary swap partition.

18. The apparatus of claim 17 wherein the upgrade module further comprises:

a second boot portion for rebooting the computer system using the increased swap partition, the second computer system being upgraded with the increased swap partition without reinstalling the UNIX type operating system.

19. The apparatus of claim 18 wherein the first and second boot portions are the same boot portion.

20. The apparatus of claim 17 wherein the upgrade module further comprises:

a preparation portion for preparing a first storage area located such that the contiguous expansion of the primary swap partition is impeded, the first storage are being prepared for allocation as an available storage area to allow contiguous expansion of the primary swap space, wherein the preparation module prepares the first storage area before the first boot module boots the computer system to single user mode.

21. The apparatus of claim 20 wherein the preparation portion comprises:

a relocation portion for relocating data stored in the first storage area if data is stored in the first storage area; and a redesignation portion for redesignating portions of the first storage area as available storage space if portions of the first storage area are designated to store temporary information.

22. The apparatus of claim 21 wherein the preparation portion further comprises:

a restoration portion for restoring the relocated data to a storage area on the root volume group after the resize module increases the size of the primary swap logical volume.

23. The apparatus of claim 17 wherein the first boot portion comprises:

a shutdown portion for initiating a boot of the computer system;

a boot interrupt portion for interrupting the boot of the computer system;

a select boot path portion for selecting a boot path; and an kernel load portion for loading a kernel to the computer system, the kernel load portion including a single user selection option.

* * * * *